United States Patent Office 2,713,363
Patented July 19, 1955

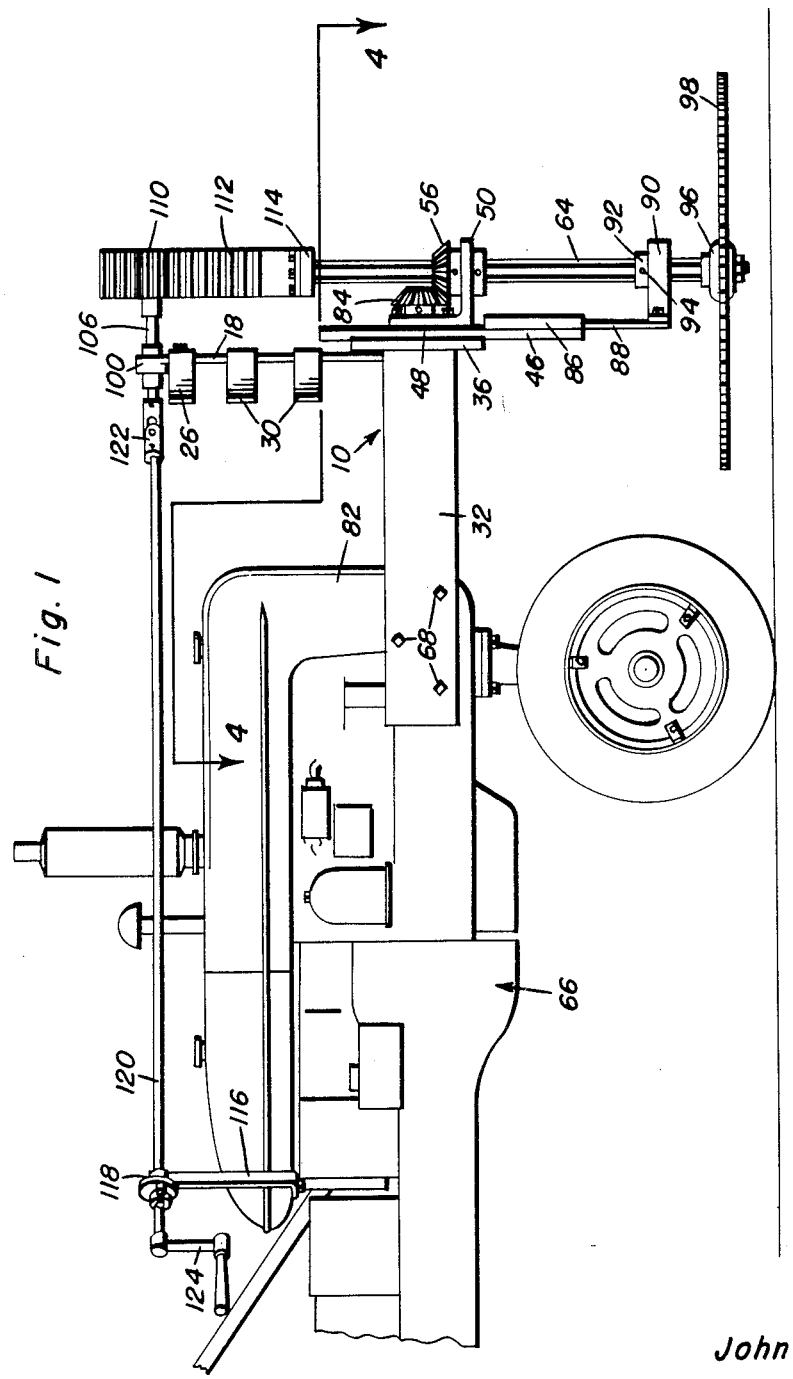

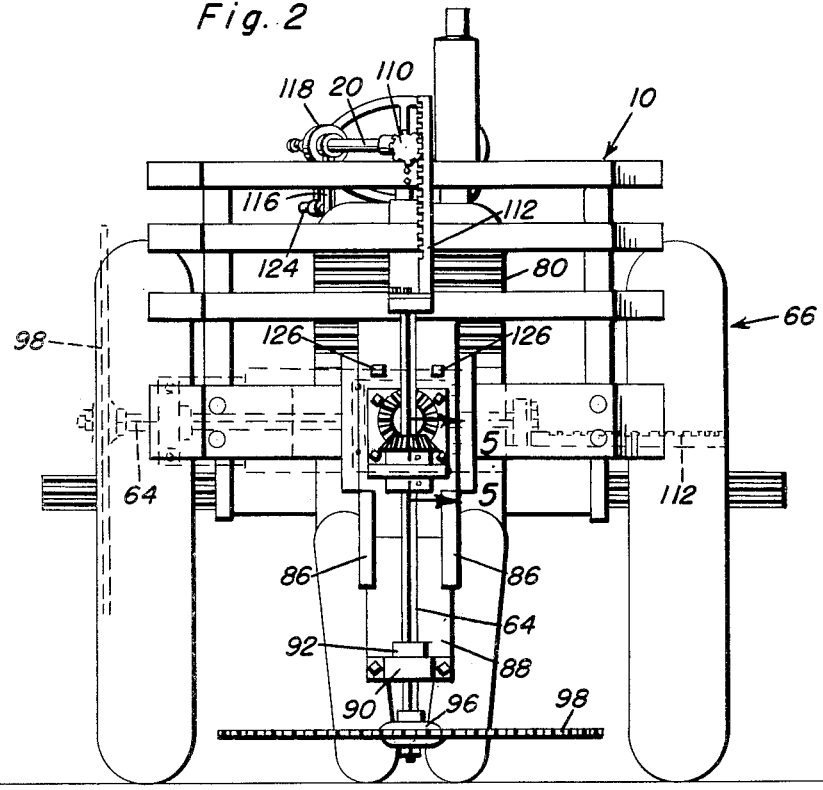
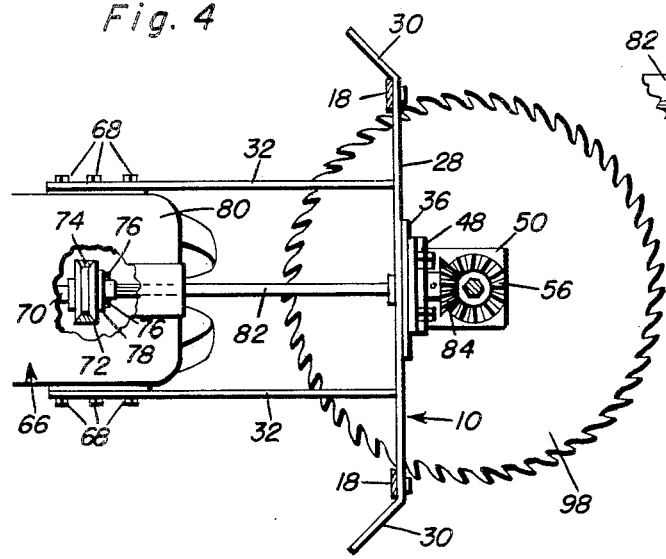
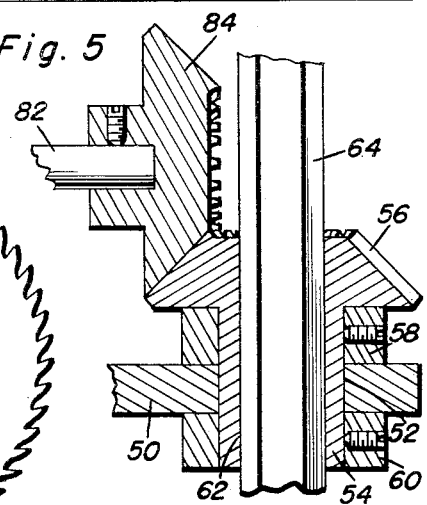
John T. Ryals
INVENTOR.

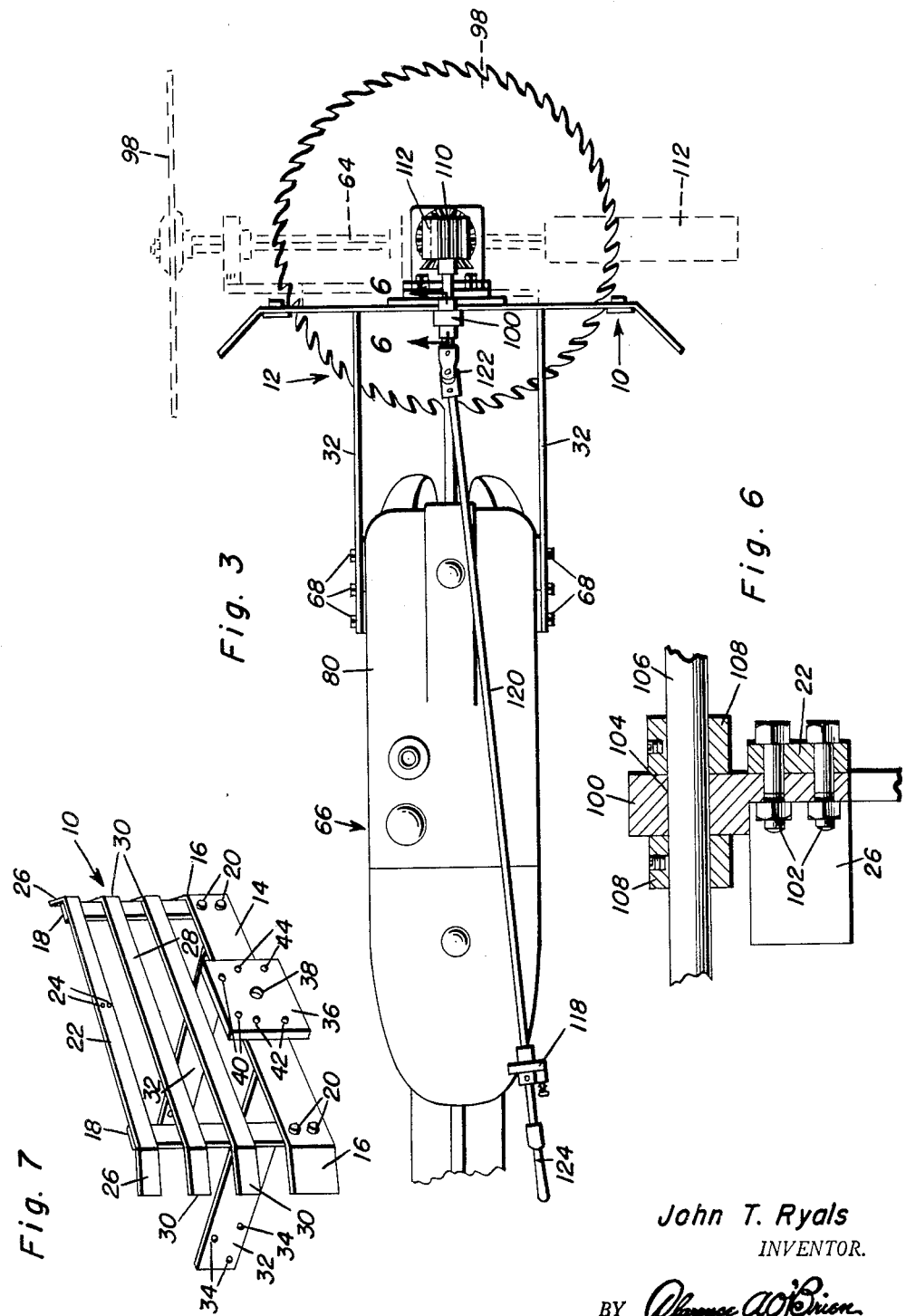

2,713,363

TREE FELLING AND LOG SAWING TRACTOR MOUNTED SAW

John T. Ryals, Unionville, Mo.

Application September 9, 1952, Serial No. 308,567

2 Claims. (Cl. 143—43)

This invention relates in general to saw constructions, and more specifically to a portable saw adapted to be mounted on a tractor.

The primary object of this invention is to provide an improved saw construction which may be conveniently mounted on existing tractors and driven by the motor of the same, said saw being controllable remotely by an operator of the tractor on which the same is mounted.

Another object of this invention is to provide an improved tractor mounted saw which may be selectively positioned for either cutting in a horizontal plane or in a vertical plane whereby the same may be utilized for cutting down trees and then cutting the same into short lengths.

Another object of this invention is to provide an improved tractor mounted saw, said saw being so constructed and designed whereby the same may be easily and quickly attached to and removed from existing tractors with a minimum of modification to the tractor.

Another object of this invention is to provide an improved tractor mounted saw which is of an extremely simple construction and which is compact in design, the saw being formed of readily obtainable materials whereby the same is economically feasible.

A further object of this invention is to provide an improved tractor mounted saw which includes a drive shaft having a saw blade mounted thereon for rotation, said drive shaft being movable vertically in order to adjust the height of the saw blade.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a fragmentary side elevational view of a conventional tractor having mounted thereon the improved tractor mounted saw which is the subject of this invention and shows the general arrangement of the same;

Figure 2 is a front elevational view of the tractor of Figure 1 and shows the position of the tractor mounted saw with respect to the tractor when the same is positioned for cutting in a horizontal plane;

Figure 3 is a fragmentary top plan view of the tractor of Figure 1 and shows the position of the tractor mounted saw with relation to the front of the tractor, a vertical position of the saw blade being shown in dotted lines;

Figure 4 (Sheet 2) is a fragmentary transverse horizontal sectional view taken substantially upon the plane indicated by the section line 4—4 of Figure 1 and shows the drive means for the tractor mounted saw, a portion of the hood of the tractor being broken away in order to show the coupling between a main drive shaft and a motor of the tractor;

Figure 5 is an enlarged fragmentary transverse vertical sectional view taken substantially upon the plane indicated by the section line 5—5 of Figure 2 and shows the manner in which a main drive shaft is connected to a drive shaft for a saw blade to permit driving of the same simultaneously with the vertical adjustment of the same;

Figure 6 (Sheet 3) is an enlarged fragmentary transverse vertical sectional view taken substantially upon the plane indicated by the section line 6—6 of Figure 3 and shows the construction of mounting means for a control shaft of the tractor mounted saw construction; and, Figure 7 is a fragmentary perspective view of a supporting frame of the tractor mounted saw, the supporting frame being illustrated on a reduced scale and showing the general construction of the same.

Similar characters of reference designate similar or identical elements and portions throughout the specification and throughout the different views of the drawings.

Referring now to the drawings in particular, it will be seen that there is illustrated in Figure 7 a supporting frame which is referred to in general by the reference numeral 10 and which forms the support for the tractor mounted saw which is the subject of this invention, the tractor mounted saw being referred to in general by the reference numeral 12. The supporting frame 10 includes a main lower horizontal frame member 14 which has rearwardly and outwardly extending end portions 16. Secured to the central portion of the main frame member 14 adjacent the intersection of the same with the end portions 16 is a pair of vertical frame members 18. The vertical frame members 18 are rigidly secured to the rear of the lower frame member 14 by suitable fasteners 20.

Secured to the upper end of the vertical frame members 18 and extending therebetween is an upper horizontal frame member 22. The upper horizontal frame member 22 is provided with a pair of vertically aligned centrally disposed apertures 24 whose purpose will be explained in more detail hereinafter. The upper horizontal frame member 22 also includes rearwardly and outwardly projecting end portions 26 which are in vertical alignment with the end portions 16.

Also carried by the vertical frame members 18 is a pair of intermediate frame members 28 which are spaced equidistant between the lower horizontal frame member 14 and the upper horizontal frame member 22. The intermediate frame members 28 are provided with rearwardly and outwardly extending end portions 30 which are in alignment with the end portions 16 and 26. The horizontal frame members not only function to support elements of the tractor mounted saw, but are so designed whereby they prevent a tree being cut with the tractor mounted saw 12 from falling on the tractor and damaging the same as well as possibly injuring the operator thereof.

In order that the supporting frame 10 may be conveniently secured to the front portion of a frame of a tractor, the lower horizontal frame member 14 has secured to the rear side thereof intermediate the ends of the central portion a pair of rearwardly extending mounting members 32. The mounting members 32 are in the form of flat elongated rearwardly extending members and have provided therethrough adjacent their rear ends a plurality of apertures 34 for receiving mounting fasteners which will be described in more detail hereinafter.

Secured to the lower horizontal frame member 14 and disposed centrally thereof is a generally square mounting plate 36. The mounting plate 36 includes a centrally located bore 38, the bore 38 also passing through the lower horizontal frame member 14 and being adapted to receive a main drive shaft. The mounting plate 36 is also provided with a plurality of pairs of apertures which are adapted to receive fasteners. The apertures include a first pair 40 which are horizontally aligned and disposed above the bore 38. A second pair of apertures 42 are vertically aligned and disposed to the left of the bore 38, as viewed in Figure 7. A third set of apertures 44 are also vertically aligned and are disposed to the right of the bore 38.

Referring now to Figure 1 in particular, it will be seen that mounted forwardly of the supporting frame 10 and secured to the mounting plate 36 is an elongated flat support plate 46. The support plate 46 has secured thereto in substantial alignment with the mounting plate 36 a vertical flange 48 of an L-shaped mounting bracket. The L-shaped mounting bracket also includes a horizontal flange 50 which extends forwardly from the plate 46.

Referring now to Figure 5 in particular, it will be seen that the horizontal flange 50 is provided with a centrally located bore in which is mounted for rotation an elongated shank 54 of a bevel gear 56. The shank 54 is positioned with respect to the horizontal flange 50 by upper and lower collars 58 and 60, respectively, which are removably secured thereon and which engage the horizontal flange 50.

The shank 54 and the bevel gear 56 are provided with a continuous bore 62 therethrough. The bore 62 is of a polygonal cross-section and has slidably mounted therein a shaft 64 of a similar cross-section. Inasmuch as the bore 62 and the shaft 64 are of a polygonal cross-section, it will be seen that the shaft 64, although it is mounted for sliding movement through the bevel gear 56, will be driven in response to rotation thereof.

Referring now to Figures 4 and 5 in particular, it will be seen that the supporting frame 10 is mounted on the forward end of a conventional tractor, which is referred to in general by the reference numeral 66 by bolting the mounting members 32 to the front portion of the frame of the tractor 66. The mounting members 32 are secured to the frame by a plurality of bolts 68 which pass through the apertures 34 in the mounting members 32 and suitable apertures (not shown) in the frame.

It will be understood that the tractor 66 is provided with a motor (not shown) which includes a pulley shaft 70. Mounted on the pulley shaft 70 is a pulley 72 which has entrained thereover a drive belt 74 for driving water pumps, generator, fan, etc. of the motor. Secured to the forward end of the pulley 72 by suitable fasteners 76 is a coupling member 78. Passing through the forward end of a grill 80 of the tractor 66 is a main drive shaft 82 whose rear end is splined within the connector 78. The forward end of the main drive shaft 82 passes through the bore 38 and is supported therein by suitable bearings. Removably mounted on the forward end of the main drive shaft 82 is a second bevel gear 84 which is intermeshed with the bevel gear 56 for driving the same.

Referring now to Figures 1 and 2 in particular, it will be seen that the lower portion of the plate 46 is provided with angle members 86 along the side edges thereof. Positioned between the angle members 86 and mounted for vertical sliding movement is a supporting plate 88 which has secured to the lower end thereof a forwardly extending pillow block 90. Mounted within the pillow block for rotation is a specially designed fitting 92 which has a polygonal bore therethrough complemental to the cross-section of the shaft 64. The fitting 92 is adjustably connected to the shaft 64 by an adjustable lock screw 94.

Mounted on the lower end of the polygonal cross-sectional shaft 64 through the use of saw mounting fittings 96 is a large circular saw blade 98. The circular saw blade 98 extends forwardly of the supporting frame 10 and is adapted to cut down standing timber. Inasmuch as the shaft 64 is mounted within the bevel gear 56 for vertical sliding movement and the support plate 88 is mounted with respect to the plate 46 for vertical movement, it will be seen that the saw blade 98 may also be moved vertically so as to adjust the height of cut made thereby.

Referring now to Figures 1 and 6 in particular, it will be seen that secured to the upper horizontal frame member 22 intermediate its ends is a mounting plate 100. The mounting plate 100 is secured to the upper horizontal frame member 22 by a plurality of suitable fasteners 102 passed through holes 24 and extends vertically thereof. The mounting plate 100 is provided with a horizontal bore 104 therethrough in which is rotatably journaled a shaft 106. The shaft 106 is positioned with respect to the mounting bracket 100 by a pair of collars 108 adjustably positioned thereon and engaging opposite sides of the mounting bracket 100.

The shaft 106 extends horizontally forward of the mounting bracket 100 and has mounted thereon for rotation a pinion 110. The pinion 110 is engaged with a vertically extending rack 112 and is adapted to move the same vertically upon rotation thereof. Secured to the lower end of the rack 112 and extending horizontally to one side thereof is a bearing member 114. The bearing member 114 is in supporting engagement with the upper end of the shaft 64 and at the same time permits rotation thereof. It will be seen that when the pinion 110 is rotated, the rack 112 is moved vertically with the resultant vertical movement of the shaft 64 to vertically adjust the position of the circular saw blade 98.

In order that the circular saw blade 98 may be remotely adjusted, the tractor 66 has secured thereto adjacent a seat thereof (not shown) a vertical support 116 on one side thereof. Carried by the upper end of the vertical support is a suitable bearing in which is mounted a rear portion of an elongated shaft 120. The forward end of the shaft 120 is connected to the rear end of the shaft 106 by a suitable universal coupling 122. The rear end of the shaft 120 has connected thereto a handle 124 for facilitating the rotation of the same in order that the pinion 110 may be rotated from the driver's seat of the tractor 66 to vertically adjust the position of the circular saw blade 98.

Referring now to Figures 2 and 3 in particular, it will be seen that when the circular saw blade 98 is in a horizontal position, the plate 46 is secured to the mounting plate 36 by a pair of fasteners 126 passed through the upper set of apertures 40 in the mounting plate 36. When it is desired to utilize the circular saw blade 98 for cutting off short lengths of a log, the fasteners 126 may be removed and the elements of the tractor mounted saw 12 carried by the plate 46 rotated 90° so that the circular saw blade 98 is in a vertical position as is best illustrated in Figure 3. The circular saw blade 98 is retained in this position by passing the fasteners 126 through the set of apertures 42. It will be understood that while the fasteners 126 are removed, the plate 46 is temporarily supported by the main drive shaft 82 which passes therethrough and that the same pivots thereon. The third set of apertures 44 are utilized should the vertical position of the circular saw blade 98 be desired on the opposite side of the tractor.

Inasmuch as the rack 112 no longer engages the pinion 110 when the circular saw blade 98 is in a vertical position, it will be seen that the circular saw blade 98 must be properly positioned before the same is rotated to a vertical position.

Inasmuch as the plate 46 is pivoted about the main drive shaft 82, the bevel gear 56 remains intermeshed with the bevel gear 84 and the circular saw blade 98 is driven by the main drive shaft 82 regardless of its position.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having thus described the invention, what is claimed as new is:

1. A tractor mounted saw comprising a supporting frame attachable to the tractor, a horizontal drive shaft drivable from the tractor and rotatably carried by said supporting frame, a circular saw blade, saw blade support means pivotally carried by said drive for selectively positioning said saw blade in vertical and horizontal planes, said support means including an L-shaped support pivotally carried by said drive shaft, an L-shaped hanger pivotally carried by said drive shaft, means releasably securing said support and said hanger to said supporting frame in rotatably adjusted positions about said drive shaft, a first gear on said drive shaft, a second gear journaled in said L-shaped support in meshing engagement with said first gear, a bearing carried by said hanger in alignment with said second gear, a saw shaft slidably extending through said second gear and said bearing and drivingly connected to said second gear, means carried by said bearing for locking said saw shaft against sliding movement therethrough, said hanger being adjustable in length.

2. A tractor mounted saw comprising a supporting frame attachable to the tractor, a horizontal drive shaft drivable from the tractor and rotatably carried by said supporting frame, a circular saw blade, saw blade support means pivotally carried by said drive for selectively positioning said saw blade in vertical and horizontal planes, said support means including an L-shaped support pivotally carried by said drive shaft, an L-shaped hanger pivotally carried by said drive shaft, means releasably securing said support and said hanger to said supporting frame in rotatably adjusted positions about said drive shaft, a first gear on said drive shaft, a second gear journaled in said L-shaped support in meshing engagement with said first gear, a bearing carried by said hanger in alignment with said second gear, a saw shaft slidably extending through said second gear and said bearing and drivingly connected to said second gear, means carried by said bearing for locking said saw shaft against sliding movement therethrough, said hanger being adjustable in length, cooperating means on said supporting frame and said saw shaft for axially adjustably positioning said saw shaft in said second gear when said saw shaft is in a vertical position, said saw blade being secured to said saw shaft.

References Cited in the file of this patent

UNITED STATES PATENTS

| Number | Name | Date |
|---|---|---|
| 561,587 | Hillebrand | June 9, 1896 |
| 1,336,365 | McPartland | Apr. 6, 1920 |
| 1,447,606 | Seymour | Mar. 6, 1923 |
| 2,463,232 | Zimicki | Mar. 1, 1949 |
| 2,580,110 | Mabry | Dec. 25, 1951 |
| 2,624,380 | Haynes | Jan. 6, 1953 |